(12) United States Patent
Maciolek et al.

(10) Patent No.: US 11,816,240 B1
(45) Date of Patent: Nov. 14, 2023

(54) SELF-MODIFYING DATA CONTAINERS FOR IMPROVED DATA SECURITY

(71) Applicant: UIPCO, LLC, San Antonio, TX (US)

(72) Inventors: Michael J. Maciolek, Boerne, TX (US); Timothy Frank Davison, San Antonio, TX (US); Donnette L. Moncrief Brown, San Antonio, TX (US); Bryan J. Osterkamp, New Braunfels, TX (US); Kori Rochelle Newman, San Antonio, TX (US); Brian Francisco Shipley, Plano, TX (US); Eric David Schroeder, San Antonio, TX (US); Robert Wiseman Simpson, Fair Oaks Ranch, TX (US); Manfred Amann, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 82 days.

(21) Appl. No.: 17/102,859

(22) Filed: Nov. 24, 2020

Related U.S. Application Data

(60) Provisional application No. 62/940,986, filed on Nov. 27, 2019.

(51) Int. Cl.
*G06Q 20/38* (2012.01)
*G06Q 20/40* (2012.01)
*G06Q 40/02* (2023.01)
*G06F 16/23* (2019.01)
*G06F 21/62* (2013.01)

(52) U.S. Cl.
CPC ...... *G06F 21/6227* (2013.01); *G06F 16/2379* (2019.01); *G06Q 20/382* (2013.01); *G06Q 20/401* (2013.01); *G06Q 40/02* (2013.01); *G06F 2221/2107* (2013.01); *G06Q 2220/00* (2013.01)

(58) Field of Classification Search
CPC ............. G06F 21/6227; G06F 16/2379; G06F 2221/2107; G06Q 20/382; G06Q 20/401; G06Q 40/02; G06Q 2220/00
USPC .......................................................... 726/26
See application file for complete search history.

(56) References Cited

U.S. PATENT DOCUMENTS

| 2008/0201384 | A1* | 8/2008 | Batterywala | ............ G06F 16/13 |
| 2013/0208893 | A1* | 8/2013 | Shablygin | ............. H04L 9/0894 |
| | | | | 380/277 |
| 2014/0040638 | A1* | 2/2014 | Barton | ................... H04L 41/00 |
| | | | | 713/193 |

(Continued)

*Primary Examiner* — Jessica Lemieux
*Assistant Examiner* — Merritt J Hasbrouck
(74) *Attorney, Agent, or Firm* — Plumsea Law Group, LLC

(57) ABSTRACT

A self-modifying data container for improved data security and methods of use are disclosed. The self-modifying data container includes a data storage structure for storing financial transaction information. The self-modifying data container also includes a data manager stored as code within the container. The data manager can run on a system hosting the self-modifying data container. The data manager can access transaction information in the data storage structure and modify the data in response to modification triggers. The data manager can delete data in the data storage structure. The data manager can also encrypt data in the data storage structure. The self-modifying data container improves both data security and data privacy.

13 Claims, 11 Drawing Sheets

(56) References Cited

U.S. PATENT DOCUMENTS

2018/0130158 A1\* 5/2018 Atkinson ............ G06F 21/6209

\* cited by examiner

SELF-MODIFYING DATA CONTAINERS FOR IMPROVED DATA SECURITY

CROSS-REFERENCE TO RELATED APPLICATIONS

This application claims the benefit of Provisional Patent Application No. 62/940,986 filed Nov. 27, 2019, and titled "Self-Modifying Data Containers for Improved Data Security," which is incorporated by reference herein in its entirety.

TECHNICAL FIELD

The present disclosure generally relates to data, and specifically to data security.

BACKGROUND

The rate at which information related to various financial transactions made by consumers is being captured and stored is increasing. This data may be maintained by merchants, banks, credit card companies, or other financial intermediaries. Concerns about how companies may use this consumer data, along with concerns about data being hacked, has led to an increased interest in data control and privacy. Many consumers would prefer that their financial transaction data not be stored for long periods of time by the companies with access to that data. However current methods of capturing and storing financial transaction data provide little control over how long data can be stored or otherwise kept private.

There is a need in the art for a system and method that addresses the shortcomings discussed above.

SUMMARY

In one aspect, a self-modifying data container for improved data security associated with a financial transaction made by a consumer includes a data storage structure including transaction information about the financial transaction and a data manager. The data manager can read the transaction information and the data manager can delete at least some of the transaction information in response to a deletion trigger to keep the transaction information secure.

In another aspect, a self-modifying data container for improved data security associated with a financial transaction made by a consumer includes a data storage structure including transaction information about the financial transaction and a data manager. The data manager can read the transaction information and the data manager can encrypt at least some of the transaction information in response to an encryption trigger to keep the transaction information secure.

In another aspect, a method of creating a self-modifying data container for improved data security includes steps of receiving financial transaction information and generating a new self-modifying data container. The self-modifying data container includes a data storage structure and a data manager that can access the data storage structure and modify data in the data storage structure. The method also includes steps of populating one or more fields in the data storage structure using the received financial transaction information and setting at least one modification trigger. The modification trigger indicates the circumstances under which the data manager will modify data in the data storage structure in order to keep the financial transaction information secure.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a system and method for automatically modifying data in response to various kinds of triggers. The system comprises a self-modifying data container with a data storage structure and a data manager. The data manager is built into the data container and can read and modify data in the data storage structure. The data manager can be run on a local host storing the data container. While running on the local host, the data manager can check for triggers that indicate that data should be deleted or encrypted. The triggers can be time/date based or event based.

By embedding a data manager into a data container, the data container can delete or encrypt its own data. This prevents the data from being stored and used for indefinite periods of time. This also reduces the chances that the financial transaction data can be hacked while maintained in long term storage. Instead, the financial transaction data is accessible only as long as it is needed to process a financial transaction. This provides a data container that may greatly improve data security and privacy for consumers and other parties involved in a financial transaction.

Figure 1:
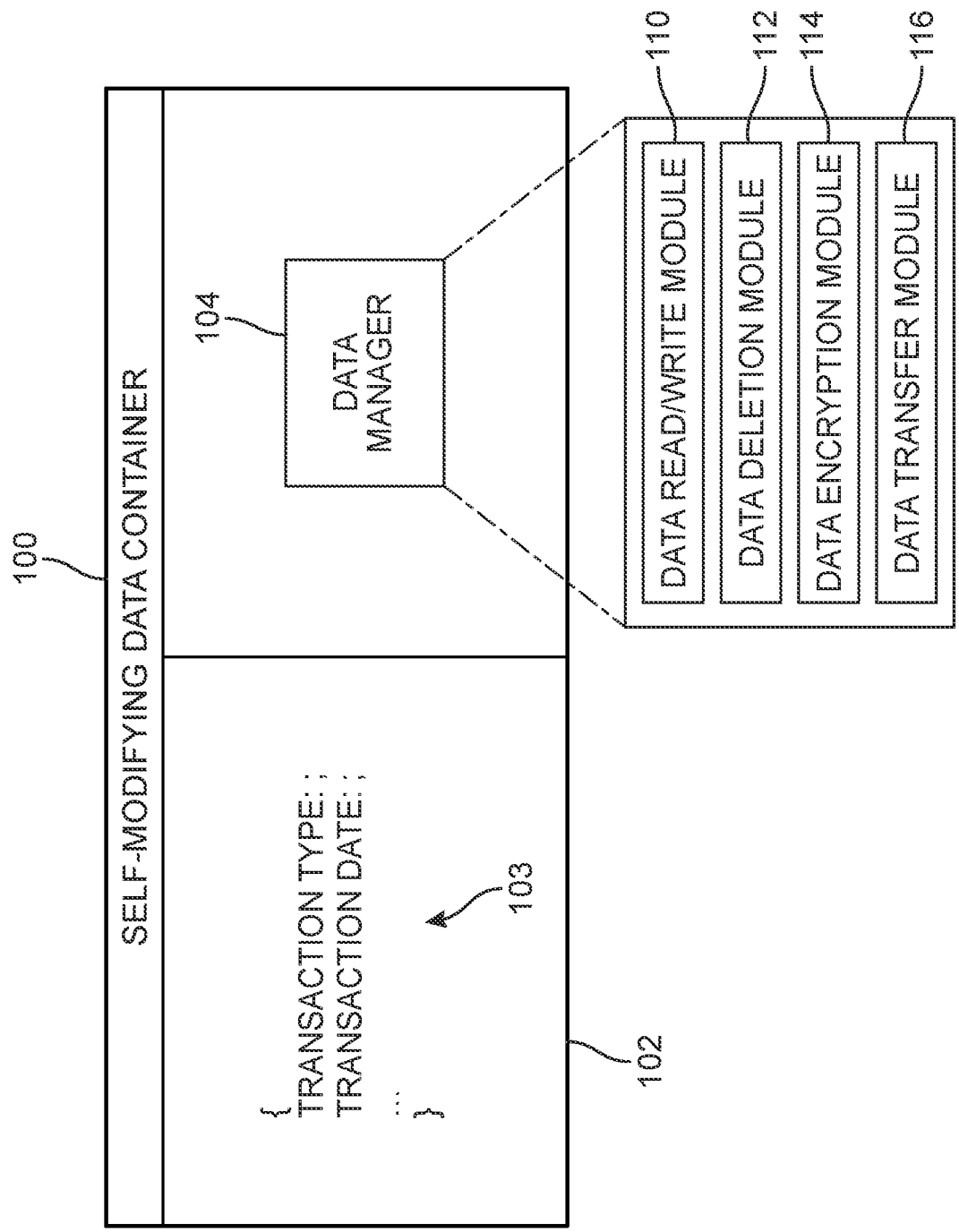
FIG. 1 is a schematic view of a self-modifying data container, according to an embodiment.

FIG. 1 is a schematic view of an embodiment of a self-modifying data container 100. Self-modifying data container 100, also referred to simply as container 100, includes both a data storage structure 102 and a data manager 104.

Data storage structure 102 comprises a data structure that retains data. Data storage structure 102 could comprise any type of data structure known in the art. These include, but are not limited to: arrays, linked lists, records, unions, tagged unions, objects, graphs, and binary trees.

Generally, data storage structure 102 may store any suitable kinds of data. In some embodiments, data storage structure 102 may store financial transaction data. As used herein, the term "financial transaction data" (also referred to as "financial transaction information") refers to any data related to one or more financial transactions. Financial transaction data may include data related to a variety of different transaction types. Transaction types could include, but are not limited to: new financial payments, recurring financial payments, bank transfers, wire transfers, checking transactions, as well as other known kinds of financial transactions.

The data stored within a data storage structure 102 may generally depend on the type of transaction. In the exemplary embodiment, data fields 103 comprise at least a transaction type, and a transaction date. Embodiments can include any number of suitable data fields associated with a financial transaction. Some other possible data fields include a "To Account" data field that allows systems to record the destination account for a given transaction; a "To Account Routing Number" data field that allows systems to record a particular routing number for the destination account; and a "To Account Type" data field that allows systems to record an account type for the destination account (such as Checking, Savings, Credit Card Broker, etc.). Data fields can also include fields for the originating (or "from") account, including a "From Account" data field, a "From Account Routing Number" data field, and a "From Account Type" data field. Data fields can also include: an "amount" data field that allows systems to record the amount of money being transacted; a "Scheduled On" data field that allows systems to record a date that the scheduled transaction was entered; a "Scheduled for" data field that allows systems to record a future day when a transaction should be processed; a "Submitted by" data field that allows systems to record a submitting party for the transaction (for example, Signatory, Primary, and Secondary parties); a "Requested by" data field that allows systems to record a requesting party for the transaction; and an "originated by" data field that allows systems to record an originating party for the transaction (for example, "Primary", "Signatory on behalf of the primary," etc.). In addition, data fields could include a "Memo field" data field that allows systems to record any information in the memo field of a funds transfer or bill pay transaction.

Data fields may also include source system information, such as a "Source System Confirmation ID" data field, a "Source System Generated ID" data field, and a "Source" data field. The ID fields may be populated with numbers, while the "source" data field may indicate the name of a financial partner or other company participating in the transaction. Data fields may also include a "Type" data field that allows systems to record event types and a "Channel" data field that allows systems to record the channel or platform through which the transaction occurred, such as "web", "mobile," "representative," or "voice."

Other data fields may comprise a "Status" data field that allows systems to record the status of a transaction, for example either "pending" or "processed." Data fields may also allow for the recording of dates and times indicating when a transaction is posted, settled, time until a transaction is live, and time until a transaction is displayed. Specifically, data fields can include a "Posted Date" data field, a "Settlement Date" data field, a "Time to Live" data field, and a "Time to Display" data field.

Data manager 104 may also be embedded within container 100. In some cases, data manager 104 may be stored as executable code within container 100. As described in further detail below, data manager 104 may be run (that is, executed) on a computing system where container 100 is stored (either temporarily or permanently).

Data manager 104 comprises various modules. These include a data read/write module 110, a data deletion module 112, a data encryption module 114, and a data transfer module 116. Data read/write module 110 may comprise provisions for reading data from data storage structure 102. Specifically, data read/write module 110 includes methods, functions, or other provisions for accessing one or more of the data fields 103. Data deletion module 112 comprises provisions for deleting information in one or more of data fields 103. Data encryption module 114 comprises provisions for encrypting information in one or more of data fields 103. Data transfer module 116 comprises provisions for transferring information to another system.

Figure 2:
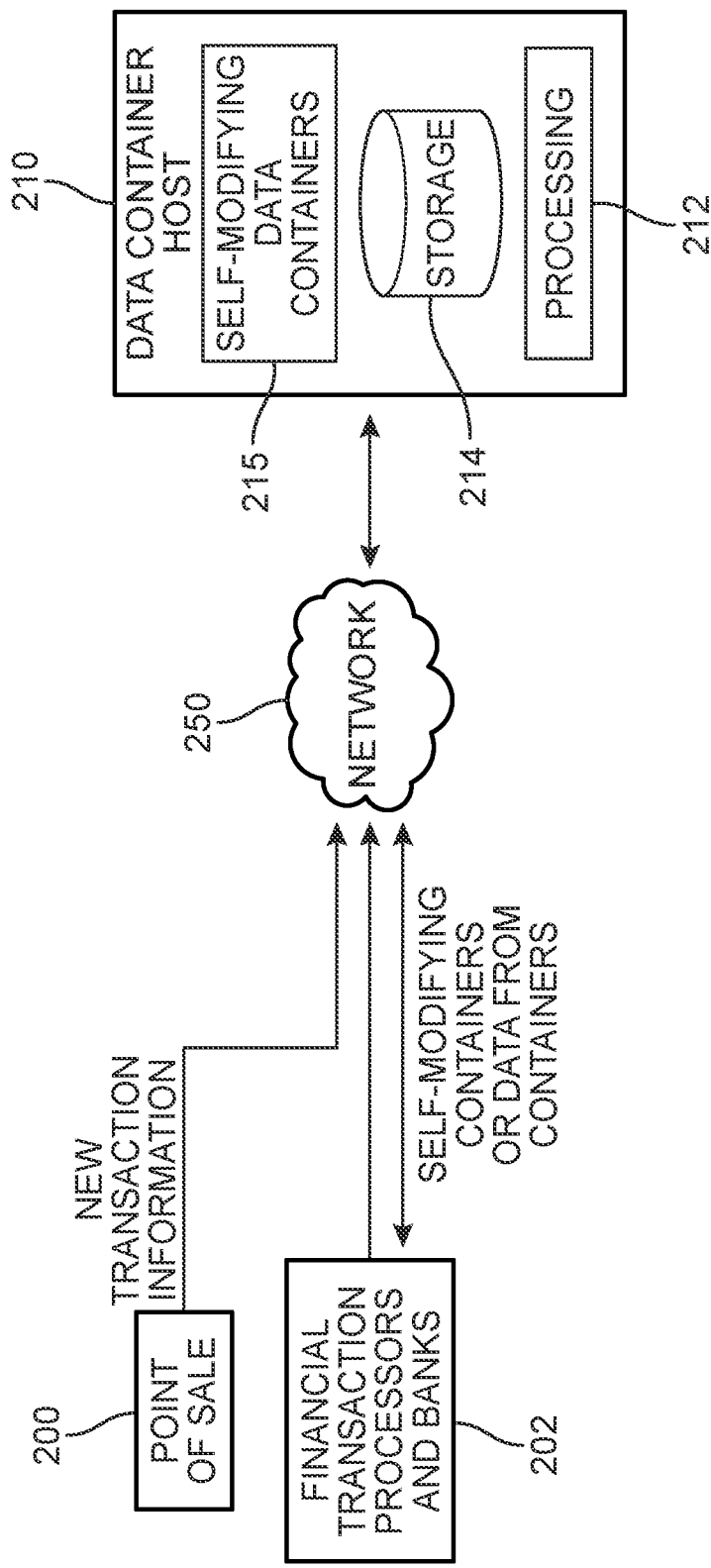
FIG. 2 is a schematic view of an embodiment of an architecture for implementing self-modifying data containers.

FIG. 2 is a schematic view of one possible architecture for a financial system that makes use of self-modifying data containers, such as container 100. In this example, new transaction information may be generated by one or more parties. In some cases, new transaction information can be generated by a point of sale system 200 associated with a merchant or other financial party. For example, if a user (or consumer) purchases a new item at a retailer, the point of sale system associated with the retailer may generate new transaction information associated with the purchase. Additionally, new transaction information could be generated by a bank or other kind of financial transaction processor 202. As used herein, the term "financial transaction processor" refers to any business, system, or service that is involved in processing a financial transaction. A financial transaction processor may also be referred to as a system of record. For example, if a user makes a bank to bank transfer, one or both banks party to the financial transaction may generate a set of associated financial transaction information. Other exemplary financial transaction processors include credit card services, bank to bank transfer systems, web bill pay systems, as well as other kinds of entities that process financial transactions and generate financial transaction information.

In FIG. 2, a self-modifying data containers 215 may be maintained in data container host 210. As used herein, the term "data container host" refers to a system that stores data containers. In some cases, a data container host could be part of a financial network, and could include, for example, banks, or other financial transaction processing services. In some cases, a data container host may include provisions for generating a self-modifying data container.

Data container host 210 may include one or more processing systems 212 and one or more storage systems 214. Processing systems 212 may comprise any kind of computing systems, including servers with processors and memory. Storage system 214 could comprise any suitable kind of data storage, including, for example, a database. Because various financial transaction processors often need access to financial transaction information in order to process the transaction, processors 202 may retrieve either the self-modifying data containers and/or information from data containers (i.e., raw data) from data container host 210.

It may be appreciated that information can be exchanged to and from data container host 210 using any suitable network 250. In one embodiment, network 250 may comprise a wide area network, such as the Internet.

Figure 3:
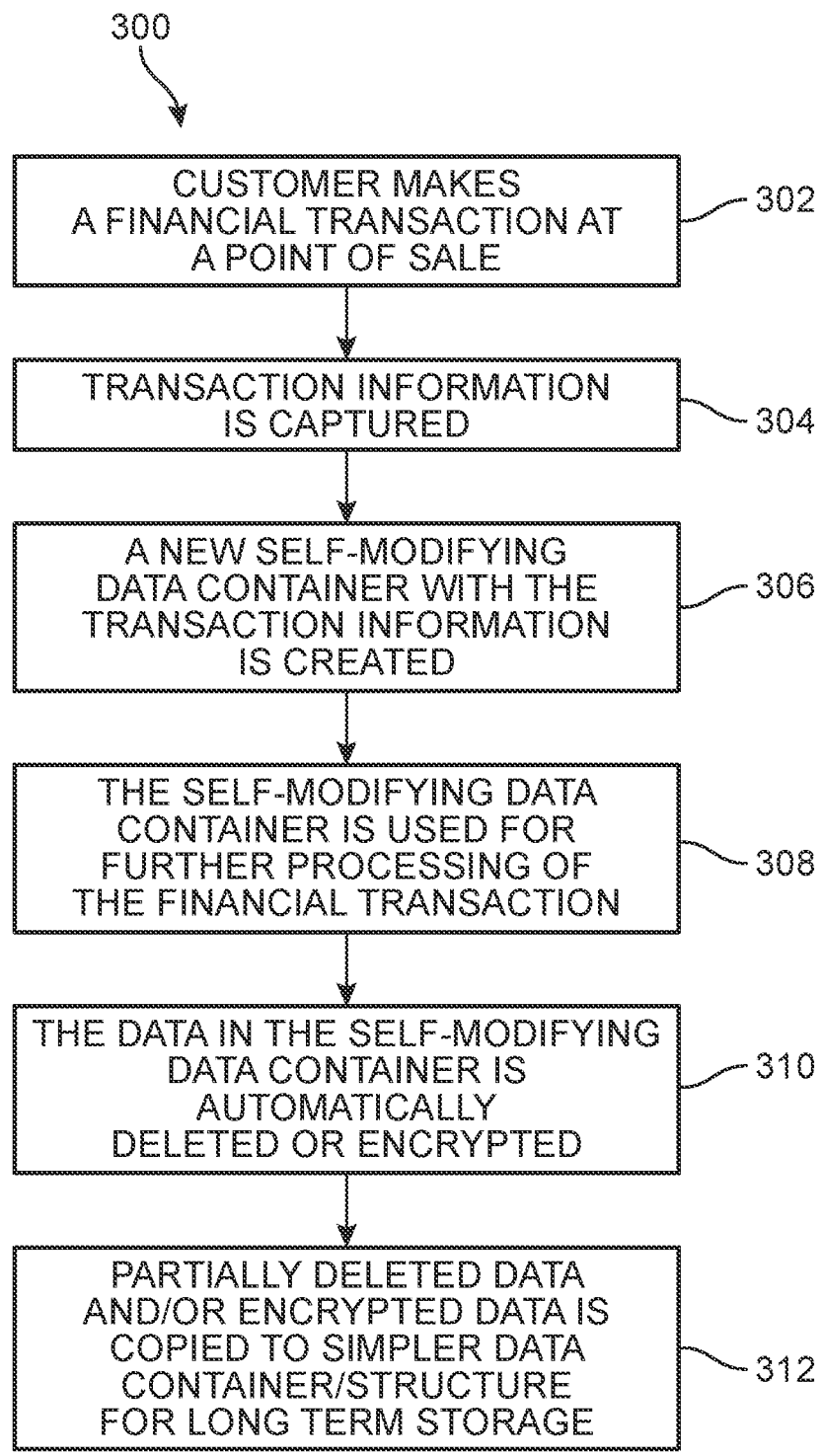
FIG. 3 is a schematic view of a process for creating and using a self-modifying data container, according to an embodiment.

FIG. 3 is a schematic view of a process for creating and using a self-modifying data container in a context where the data container stores transaction information for a financial purchase, according to an embodiment. Starting in step 302, a customer may make a financial transaction at a point of sale. Next, in step 304, the transaction information is captured. In some cases, the transaction information may be captured by a data container host, while in other cases it may be captured by some other system. In step 306, a new self-modifying data container with the transaction information is created. In some cases, the self-modifying data container could be created at a data container host. In other cases, any other suitable system with access to the financial transaction data could create the self-modifying data container.

In step 308, the self-modifying data container is used for further processing of the financial transaction. Specifically, information from one or more data fields in the data storage structure of the data container are used in processing a financial transaction.

In step 310, the data in the self-modifying data container can be automatically deleted or encrypted, as described in further detail below. This ensures that the financial transaction data does not persist indefinitely in an unencrypted form on one or more systems that could be subject to hacking.

In some cases, some data may be retained. For example, if the data is encrypted, and/or if only some data is deleted. In such cases, an optional step 312 may be performed to copy the remaining data into simpler data containers/structures for long term storage.

Figure 4:
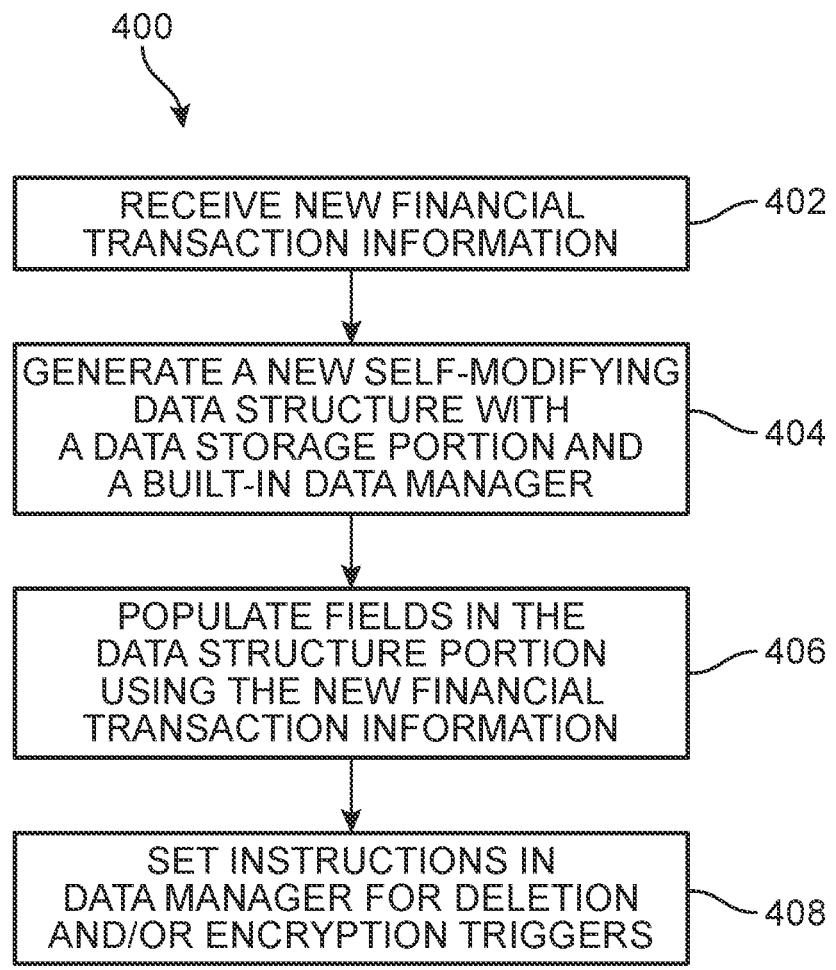
FIG. 4 is a schematic view of a process for creating a new self-modifying data container, according to an embodiment.

FIG. 4 is a schematic view of a process for creating a self-modifying data container. It may be appreciated that the following steps could be performed by any suitable system with access to require financial transaction information. In some cases, these steps could be performed by a data container host (for example, data container host 210 in FIG. 2). Starting in step 402, the data container host may receive new financial transaction information. Next, in step 404, the host may generate a new self-modifying data structure with a data storage structure and a built-in data manager. In step 406, the host may populate fields in the data storage structure using the receive financial transaction information.

Finally, in step 408, the host may set instructions in the data manager for deletion and/or encryption triggers. In different embodiments, different deletion and/or encryption triggers, collectively referred to as "modification triggers", could be used. For example, a modification trigger could be a time based trigger. That is, data may automatically be deleted and/or encrypted on a particular date at a particular time. Other modification triggers could be event based. For example, data could be deleted or encrypted after a particular authentication process has occurred, or after a financial transaction has posted.

Figure 5:
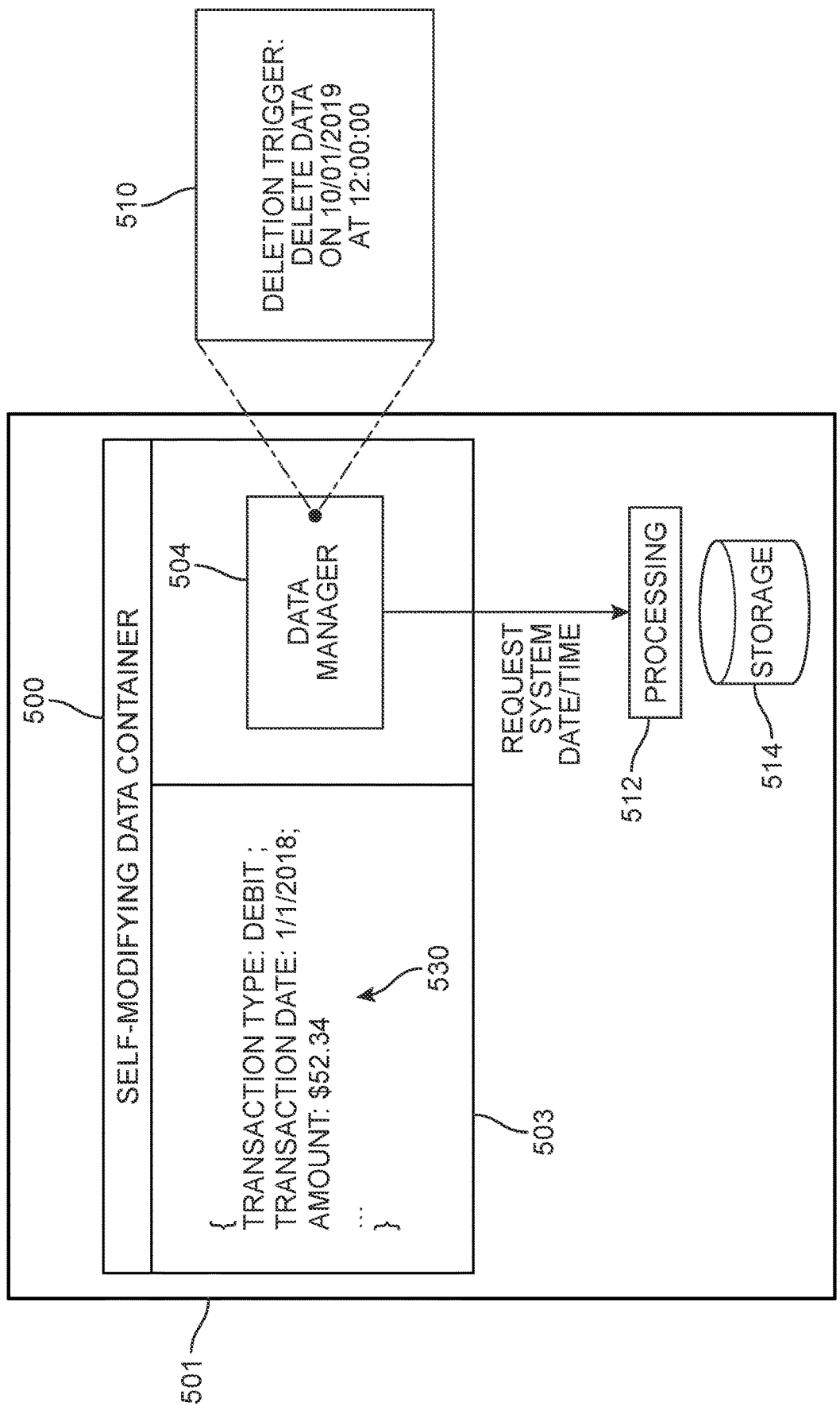
FIG. 5 is a schematic view of a scenario where a self-modifying data container checks for a deletion trigger, according to an embodiment.
Figure 6:
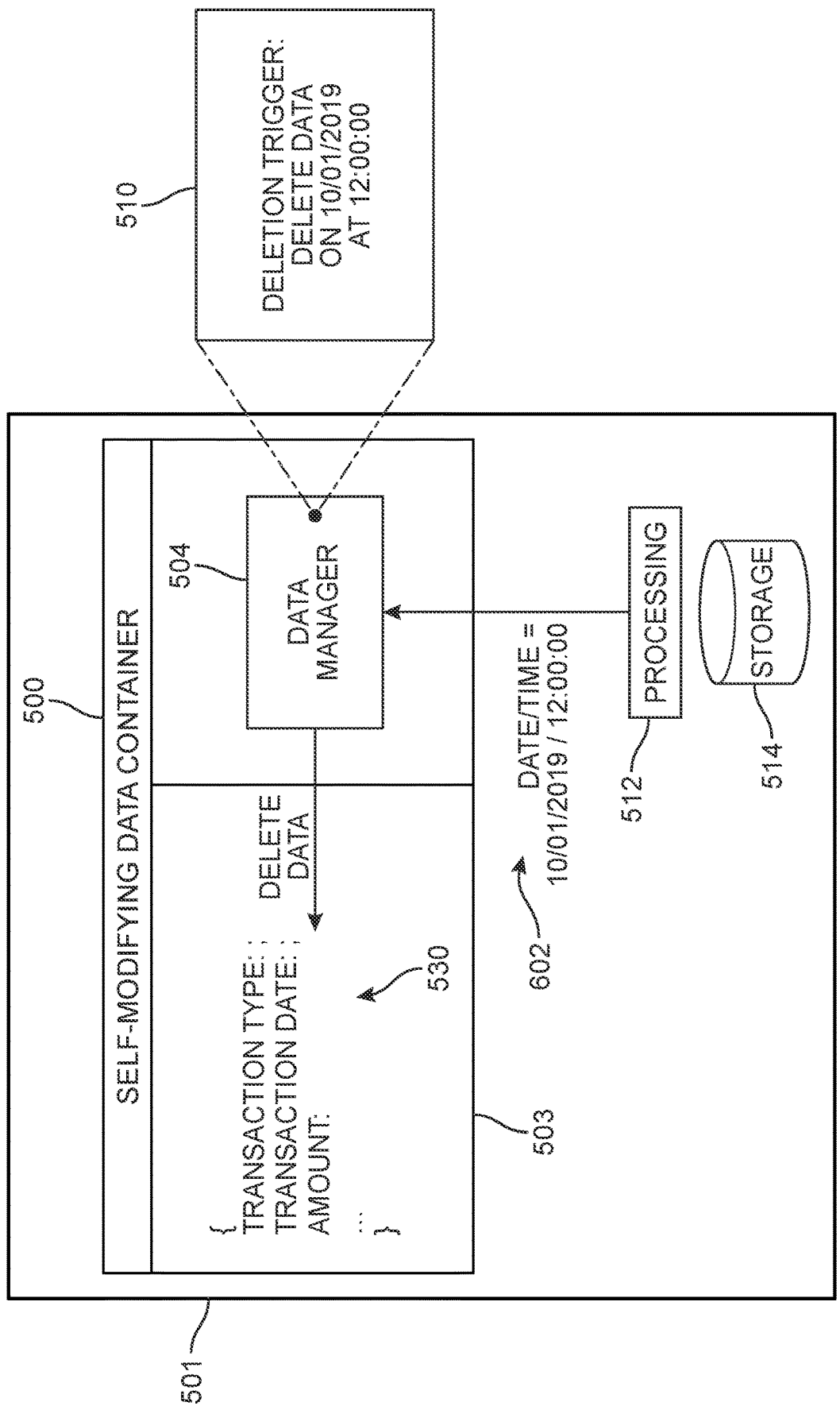
FIG. 6 is a schematic view of a scenario where a self-modifying data container deletes data in response to a deletion trigger, according to an embodiment.

FIGS. 5-6 illustrate a first exemplary scenario in which a self-modifying data container is triggered to automatically delete information in one or more data fields of the data storage structure. In FIG. 5, a self-modifying data container 500 is stored in a storage system 514 (such as a database) within a data container host 501. Self-modifying data container 500 includes a data storage structure 503, which stores financial transaction information in data fields 530. Self-modifying data container 500 also includes a data manager 504.

In some embodiments, data manager 504 may be periodically called by a process running on a processing system 512 of host 501. In this example, a deletion trigger has been previously set. Specifically, deletion trigger 510 is set within data manager 504 to "delete data on Oct. 1, 2019 at 12:00:00". As data manager 504 is periodically called by host 501 it may make a request 520 to host 501 for the system date and time. This request can be made at least once every time data manager 504 is run on host 501.

In FIG. 6, the current system date and time 602 is returned to data manager 504. Because the current system date and time 602 is equal to the deletion trigger 510 data and time, data manager 504 deletes the data in data fields 530. As seen in FIG. 6, the data fields 530 are empty after this deletion. In other embodiments, the values of data fields 530 could be changed to default values (such as 'NA', one or more predetermined characters signifying an empty field, or a specific number).

In the exemplary embodiment, a data manager may take action to delete the values of the data fields upon encountering a deletion trigger. Alternatively, in other embodiments, data manager 504 could delete the entire data storage structure 503, rather than deleting the values of the data fields. In still another embodiment, upon encountering a deletion trigger, a data manager could send a request to the host to have the entire data container deleted. As discussed in further detail below, however, it may be useful in some cases to save some data while deleting other data.

In some other embodiments, data may be deleted only after a particular type of event has occurred. For example, it may be necessary to store some kind of authenticating and/or personally identifying data in a data container while a transaction is being processed. This information may be needed to authenticate the transaction with a third party, for example. In such embodiments, a deletion trigger could be tied to the authentication event.

Figure 7:
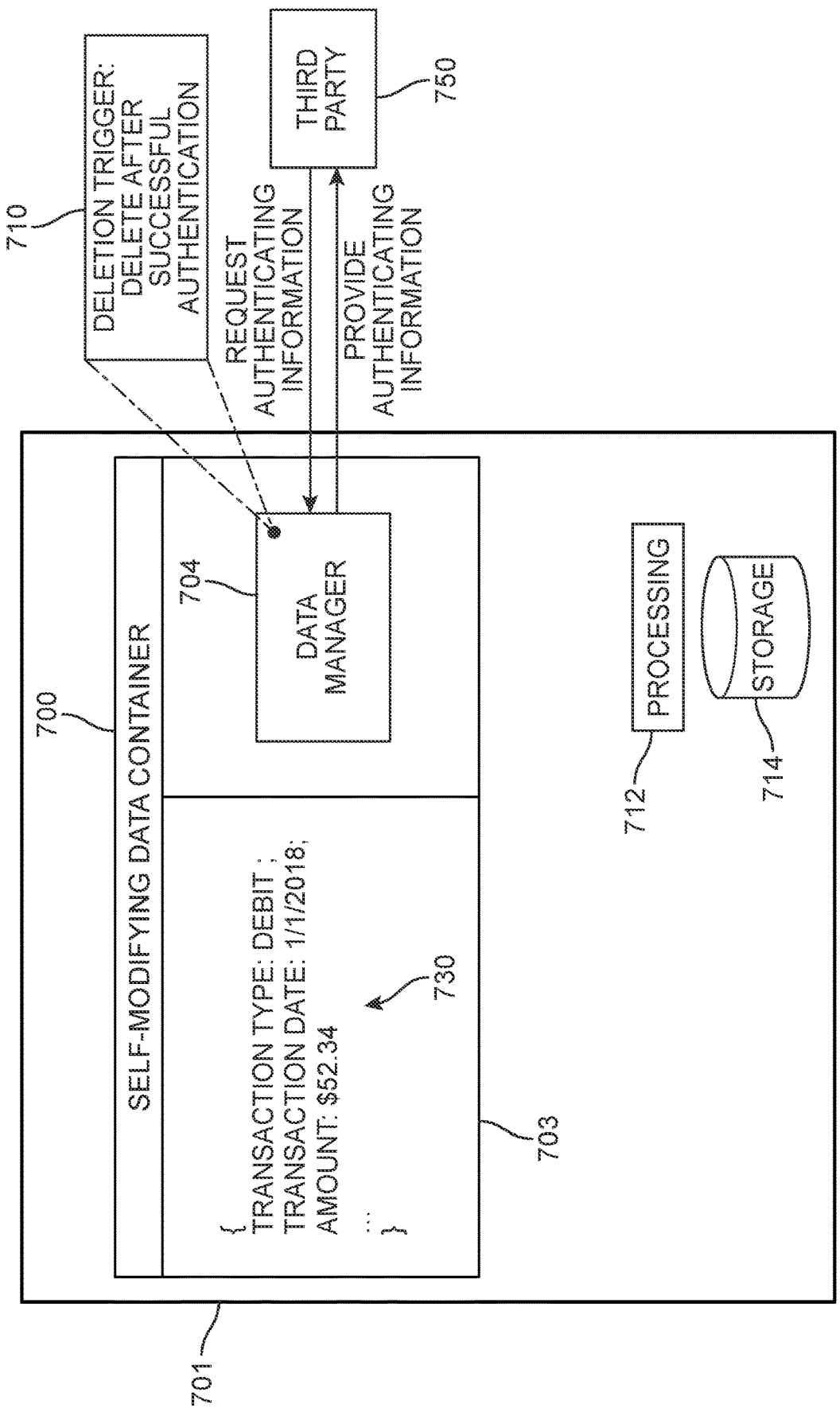
FIG. 7 is a schematic view of another scenario where a self-modifying data container checks for a deletion trigger, according to an embodiment.
Figure 8:
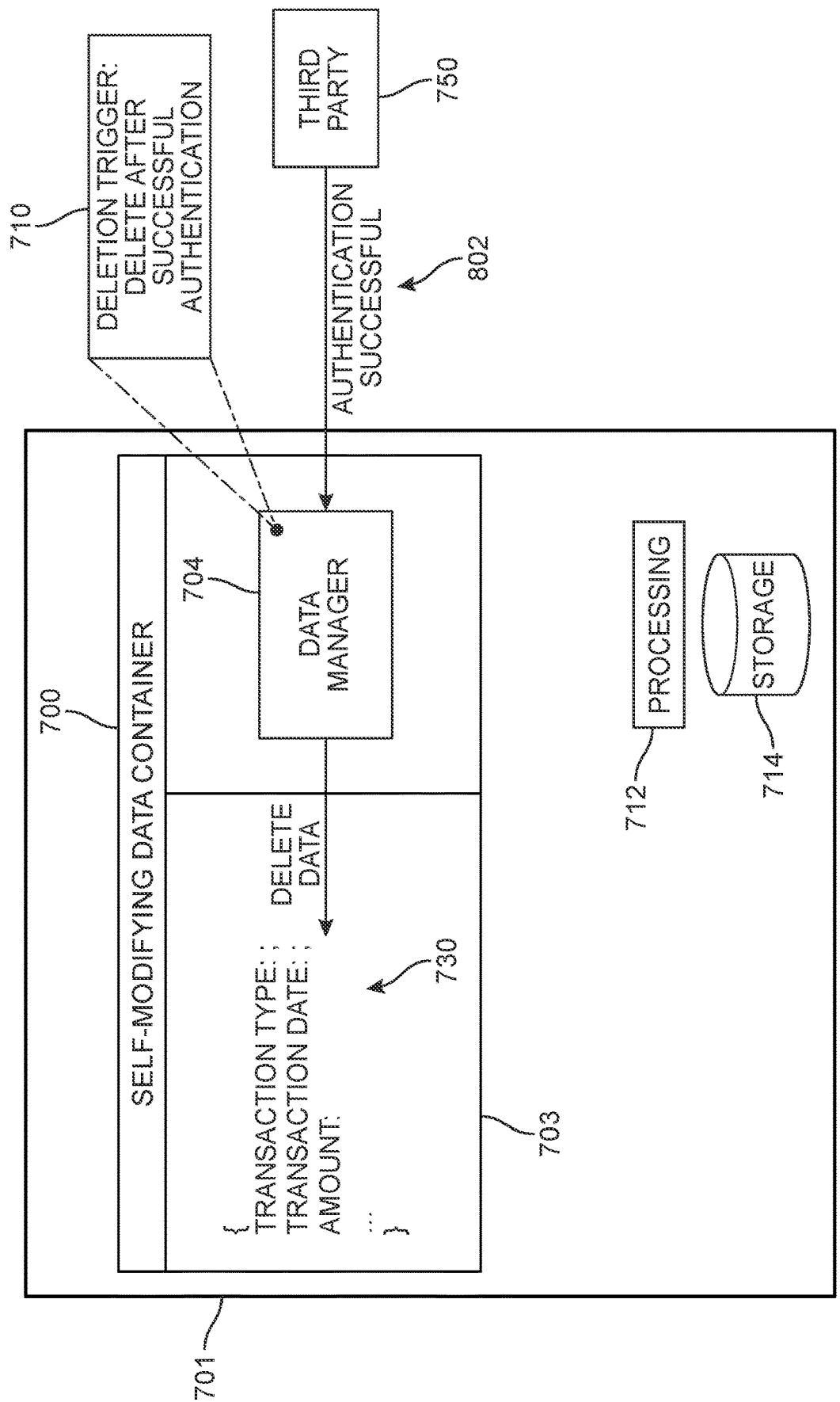
FIG. 8 is a schematic view of another scenario where a self-modifying data container deletes data in response to a deletion trigger, according to an embodiment.

FIGS. 7-8 illustrate a second exemplary scenario in which a self-modifying data container is triggered to automatically delete information in one or more data fields of the data storage structure. In FIG. 7, a self-modifying data container 700 is stored in a storage system 714 (such as a database) within a data container host 701. Self-modifying data container 700 includes a data storage structure 703, which stores financial transaction information in data fields 730. Self-modifying data container 700 also includes a data manager 704.

In the example shown in FIG. 7, a third party 750 may send a request for authenticating information to data manager 704 of self-modifying data container 700. This request for authentication may be part of processing a financial transaction. In some cases, this request may be made directly to self-modifying data container 700, which may be actively running on a processing system 712 of host 701. In other cases, the request may be made to host 701. Because self-modifying data container 700 is stored in storage system 714 of host 701, host 701 may then call data manager 704 and pass it the request. In response to the authentication request, data manager 704 may pass authenticating information back to third party 750.

In this example, a deletion trigger has been previously set. Specifically, deletion trigger 710 is set within data manager 704 to "delete after successful authentication". As seen in FIG. 8, after receiving a successful authentication message 802, data manager 704 may delete the data in data fields 730. As seen in FIG. 8, the data fields 730 are empty after this deletion. In other embodiments, the values of data fields 730 could be changed to default values (such as 'NA', one or more predetermined characters signifying an empty field, or a specific number).

In the exemplary embodiment, a data manager may take action to delete the values of the data fields upon encountering a deletion trigger. Alternatively, in other embodiments, data manager 704 could delete the entire data storage structure 703, rather than deleting the values of the data fields. In still another embodiment, upon encountering a deletion trigger, a data manager could send a request to the host to have the entire data container deleted. As discussed in further detail below, however, it may be useful in some cases to save some data while deleting other data.

Figure 9:
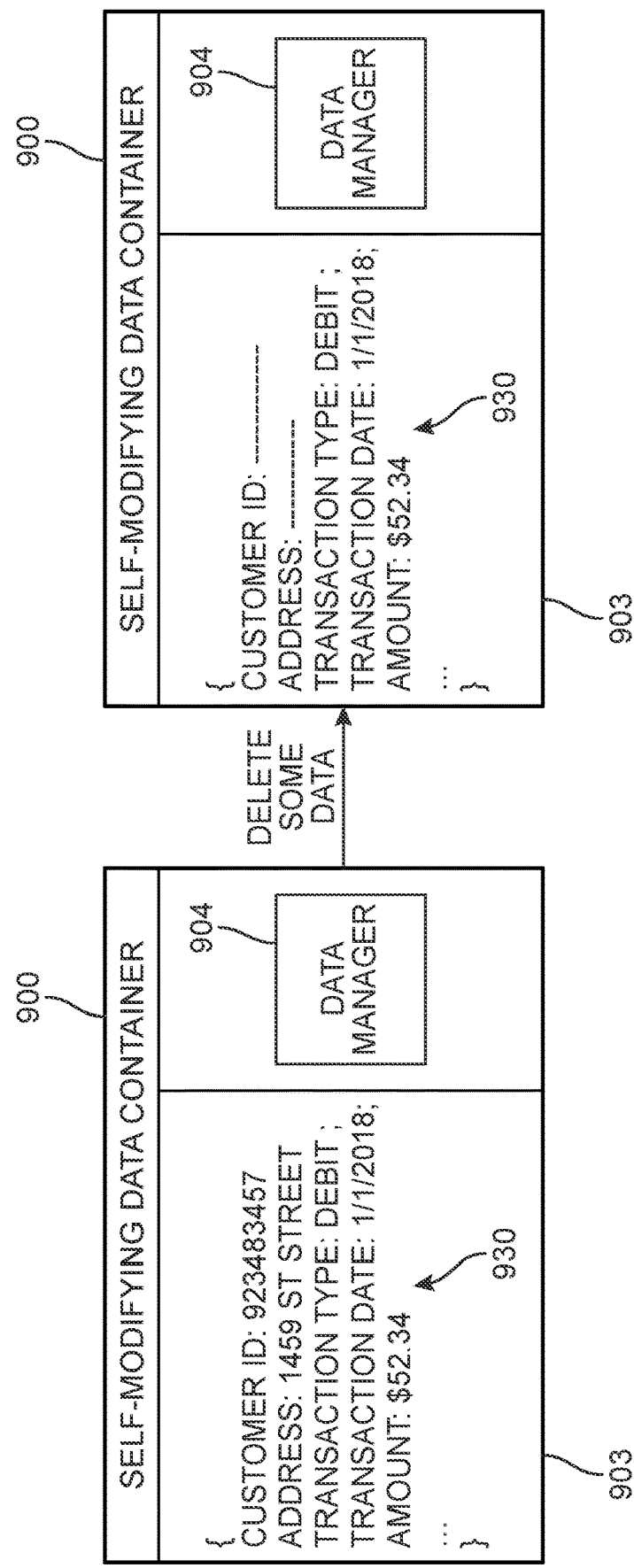
FIG. 9 is a schematic view of an embodiment of a self-modifying data container where some data is deleted, according to an embodiment.

In some situations, it may be useful to retain some information from a financial transaction for long term records while deleting other data, such as personally identifying information. In such cases, a data manager could act to delete only select data fields, rather than all the data fields in a data storage structure. For example, FIG. 9 depicts a schematic view where only some fields, corresponding to more sensitive or personally identifying information, are deleted. The remaining data can be retained for longer term storage/archiving. In the example of FIG. 9, a self-modifying data container 900 includes a data manager 904 and a data storage structure 903 with data fields 930. Once a deletion trigger has been encountered, data manager 904 takes action to delete some, but not all of the data. Specifically, as seen in FIG. 9, only personally identifying information and/or information tying the transaction to a particular customer are deleted. In this example, the "Customer ID" field and "Address" field are both deleted, but the remaining fields are not deleted. The remaining data can be retained and used for data analysis or other suitable purposes.

Figure 10:
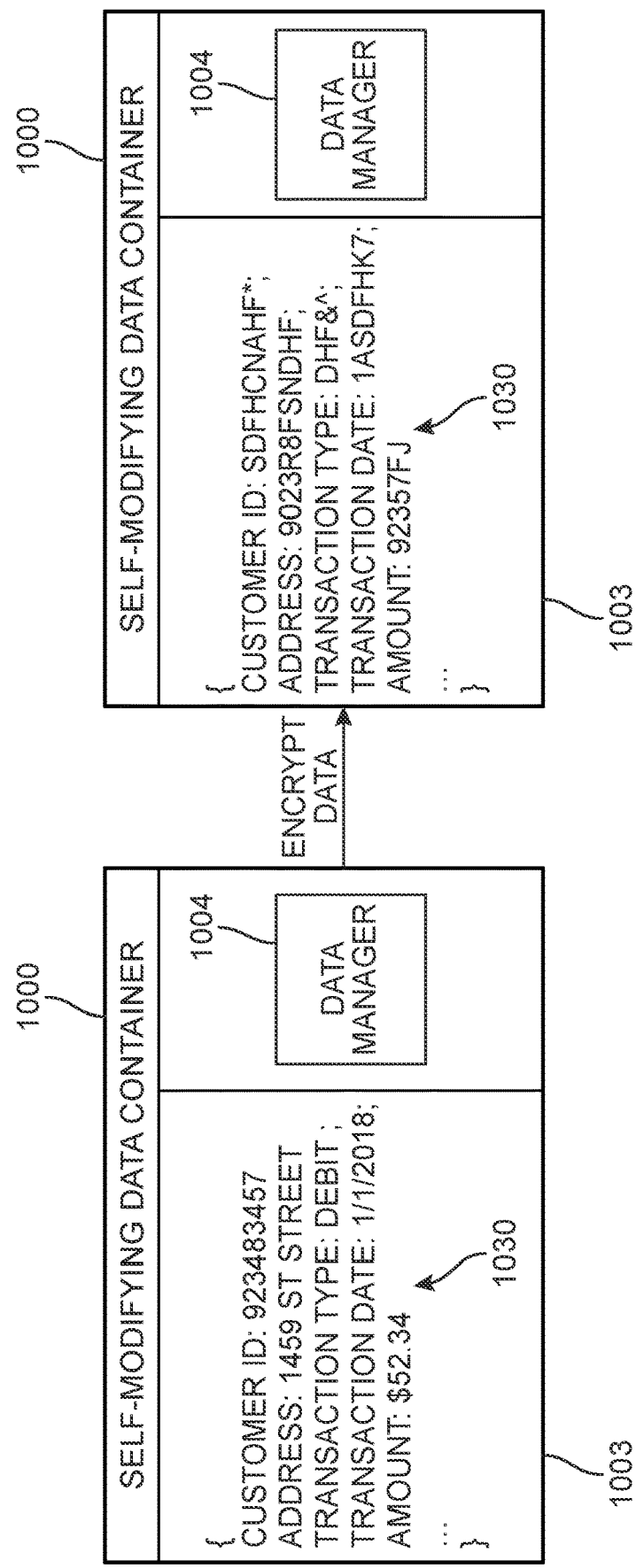
FIG. 10 is a schematic view of a self-modifying data container in which data is encrypted in response to an encryption trigger, according to an embodiment.

As already discussed, a data manager may be configured to encrypt data rather than deleting data, in response to an encryption trigger. Encryption triggers could be data and/or time based triggers, or other event based triggers such as authentication events. As seen in FIG. 10, a self-modifying data container 1000 includes a data manager 1004 and a data storage structure 1003 with data fields 1030. Once an encryption trigger is encountered, data manager 1004 takes action to encrypt the data in data fields 1030.

As discussed above with respect to step 312 in FIG. 3, in some cases it may be desirable to keep partial data and/or encrypted data for long term storage/archiving. Because sensitive data has already been removed or encrypted, it may be more efficient to store the remaining partial or encrypted data in a simpler data type that does not include its own data manager. This may reduce the size of the data structure required to store the financial transaction data and may also improve computational efficiency since there is no data manager to run on a host system.

Figure 11:
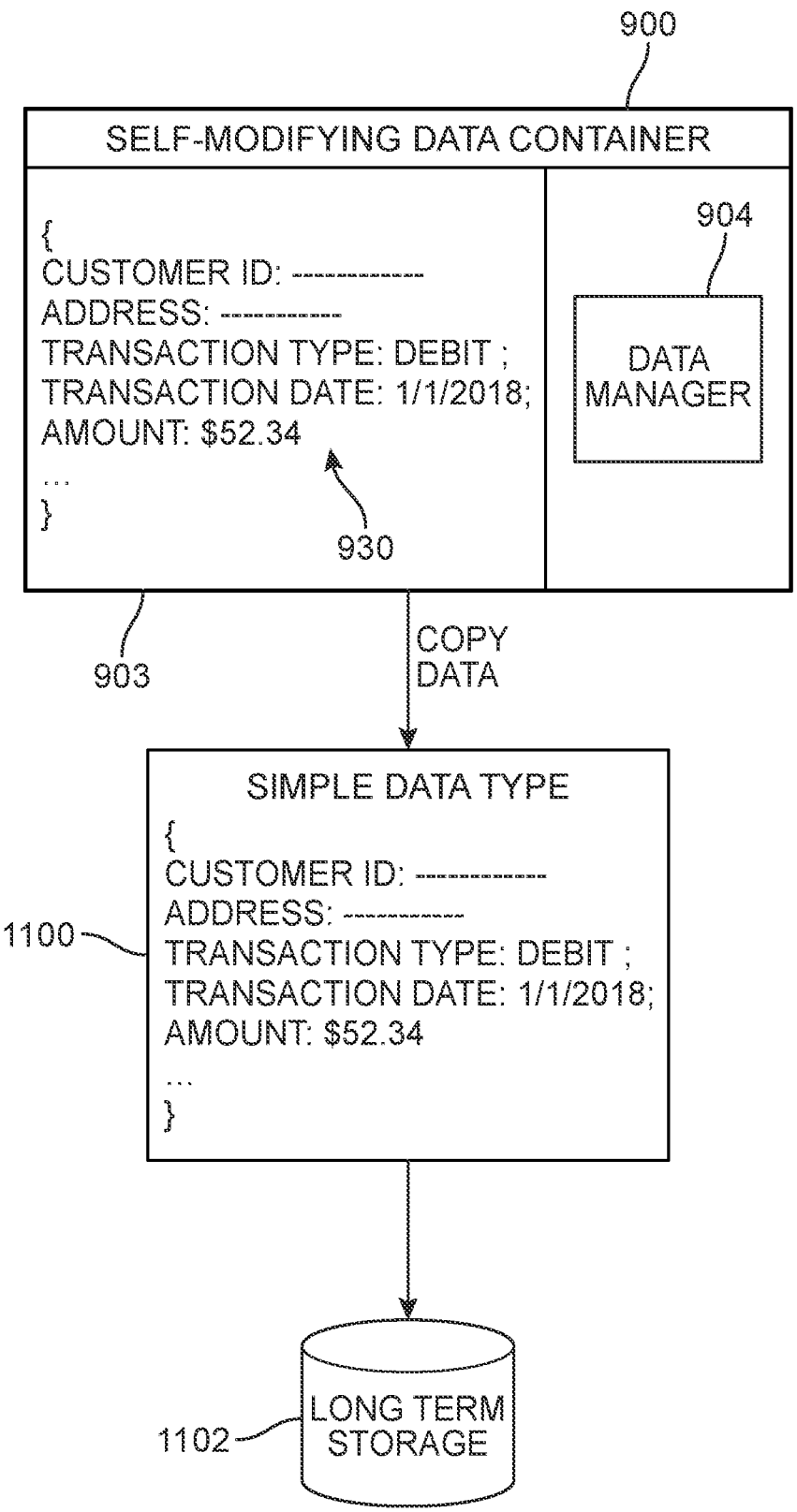
FIG. 11 is a schematic view of a self-modifying data container copying data to a simple data type for long term storage, according to an embodiment.

FIG. 11 is a schematic view of the self-modifying data container 900 of FIG. 9, after some data in data fields 930 has been deleted (namely "Customer ID" and "Address"). To save storage space and reduce the computational overhead required to access the data, the data in data fields 930 can be copied over to a simple data type 1100. A simple data type can include any suitable data type, such as a simple array, a flat file, a JavaScript Object Notation (JSON) data type, or any other suitable data type. This simple data type can then be placed in long term storage 1102. It may be appreciated that in some cases, simple data type 1100 could be an element within a database or other storage structure in long term storage 1102, rather than a separate data structure that is passed to long term storage 1102.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of authenticating data with a data container host comprising:
    generating the data at a point of sale system;
    capturing, by the data container host communicating with the point of sale system across a network, the data;
    generating, by the data container host, a self-modifying data container, the self-modifying data container including a data storage structure and a data manager stored as executable code within the self-modifying data container, wherein access to the data storage structure is controlled through the data manager;
    populating, by the data container host, one or more fields in the data storage structure with the data including authenticating information;
    setting, by the data container host, instructions in the data manager for a modification trigger, the instructions configured to cause the data manager running on a processor to check for the modification trigger, and upon encountering the modification trigger access the data storage structure and modify the data in the data storage structure, thereby securing the data;
    receiving, by the data container host from a processor across the network, a request for the authenticating information of the data;
    authenticating the data in the data storage structure by running the data manager on the data container host to access the data storage structure and the authenticating information, and providing, by the data container host to the processor across the network, the authenticating information of the data;
    encountering, by the data manager running on the data container host, the modification trigger upon completion of the authentication of the data in the data storage structure;
    accessing, using the data manager running on the data container host, the data storage structure in response to encountering the modification trigger; and
    deleting, using the data manager running on the data container host, at least a portion of the authenticating information in the data storage structure, thereby securing the portion of the authenticating information in response to encountering the modification trigger.

2. The method according to claim 1, wherein the modification trigger is a deletion trigger, and wherein the data manager, running on the data container host, performs the deletion of the portion of the authenticating information in the data storage structure in response to detecting the deletion trigger.

3. The method according to claim 1, wherein deleting, using the data manager running on the data container host, the portion of the authenticating information in the data storage structure comprises deleting a customer identification.

4. The method according to claim 1, wherein deleting, using the data manager running on the data container host, the portion of the authenticating information in the data storage structure comprises deleting an address.

5. The method according to claim 1, wherein the data manager, running on the data container host, encrypts a portion of the data different than the portion of the authenticating information deleted by the data manager in response to detecting the modification trigger.

6. The method according to claim 1, further comprising transferring, by a data transfer module of the data manager, the data, excluding the portion of the authenticating information deleted by the data manager, to another system for long term storage.

7. A method of authenticating data comprising:
    generating the data at a point of sale system;
    capturing, by a data container host communicating with the point of sale system across a network, the data;
    generating, by the data container host, a self-modifying data container, the self-modifying data container including a data storage structure and a data manager stored as executable code within the self-modifying data container, wherein access to the data storage structure is controlled through the data manager;
    populating, by the data container host, one or more fields in the data storage structure with the data;
    setting, by the data container host, instructions in the data manager for a modification trigger, the instructions configured to cause the data manager running on a processor to check for the modification trigger, and upon encountering the modification trigger access the data storage structure and modify the data in the data storage structure, thereby securing the data;

communicating, by the data container host, the self-modifying data container to a processor across the network; and authenticating, by the data manager running on the processor across the network, the data in the data storage structure by running the data manager;

encountering, by the data manager running on the processor across the network, the modification trigger upon completion of the authentication of the data in the data storage structure;

accessing, by the data manager running on the processor across the network, the data storage structure in response to encountering the modification trigger; and deleting, in response to encountering the modification trigger and using the data manager running on the processor across the network, at least a portion of the data in the data storage structure, thereby securing the data.

8. The method according to claim 7, wherein the modification trigger is a deletion trigger, and wherein the data manager, running on the processor across the network, performs the deletion of the at least the portion of the data.

9. The method according to claim 7, wherein encountering, by the data manager running on the processor across the network, the modification trigger upon completion of the authentication of the data in the data storage structure comprises receiving, by the data manager running on the processor across the network, a successful authentication message from the processor across the network, wherein the successful authentication message is the modification trigger.

10. The method according to claim 7, further comprising encrypting, by the data manager running on the processor across the network, a portion of the data different than the portion of the data deleted in response to encountering the modification trigger.

11. The method according to claim 10, further comprising transferring, by a data transfer module of the data manager, the portion of the data encrypted by the data manager to another system for long term storage.

12. The method according to claim 7, further comprising transferring, by a data transfer module of the data manager running on the processor across the network, the data, excluding the portion of the data deleted by the data manager, to another system for long term storage.

13. The method according to claim 5, further comprising transferring, by a data transfer module of the data manager, the portion of the data encrypted by the data manager to another system for long term storage.

\* \* \* \* \*